Feb. 22, 1938.                Y. SEKELLA                2,109,155
                        ENGINE STARTER DRIVE MEMBER
                            Filed Nov. 24, 1936
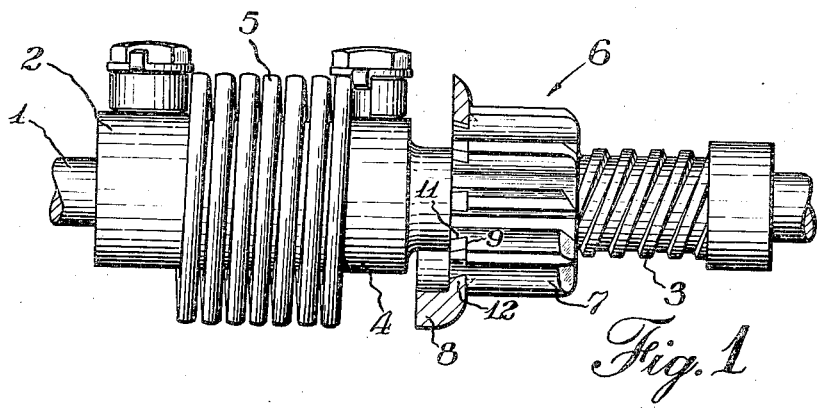
Fig. 1
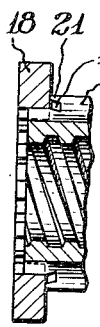  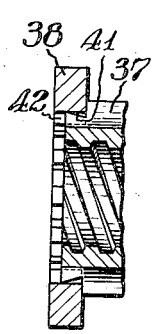 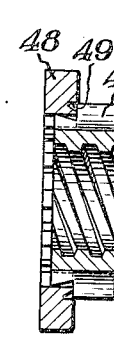  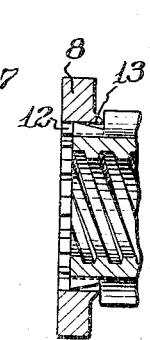 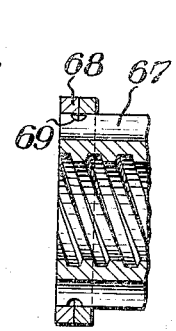
Fig. 2   Fig. 3   Fig. 4   Fig. 5   Fig. 6   Fig. 7   Fig. 8
 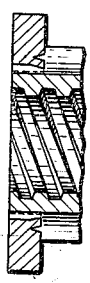   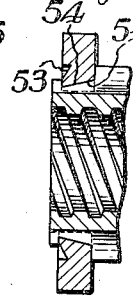 
Fig. 2a   Fig. 3a   Fig. 4a   Fig. 5a   Fig. 6a   Fig. 7a   Fig. 8a
Witness:
Burr W. Jones
INVENTOR.
BY Youston Sekella
Clinton S. Janes
ATTORNEY.

Patented Feb. 22, 1938

2,109,155

UNITED STATES PATENT OFFICE 2,109,155

ENGINE STARTER DRIVE MEMBER

Youston Sekella, Elmira, N. Y., assignor to Eclipse Machine Company, Elmira, N. Y., a corporation of New York Application November 24, 1936, Serial No. 112,548

8 Claims. (Cl. 74—7)

The present invention relates to engine starter drive members and more particularly to composite pinion members and means for permanently unifying the parts thereof.

Composite starting pinion members in which the components are joined by spinning a lip of the toothed member against the side of the counterweight member as shown in the patents to Bendix 1,212,175 and Bendix et al. 1,288,476, and similar arrangements in which the components are joined by dove-tailed projections such as in the patent to Van Ness 1,501,153, have found wide commercial acceptance, but are subject to the objections that the spinning operation is not always sufficiently secure to prevent the counterweight from working loose, and the dove-tailed projections require considerable machining operations, and these forms of fastening means do not lend themselves so readily to that type of drive in which the pinion is actuated by a barrel member anchored thereto.

It is an object of the present invention to provide novel attaching means for the parts of a composite starter drive member which is simple and economical in construction and effective and durable in operation.

It is another object to provide such a device in which the parts are caused to be locked together by integral projecting portions of large effective cross-section.

It is another object to provide such a device in which the preparatory machining operations are few and simple.

It is a further object to provide such a device which is well adapted for affixing either flange type counterweights or barrel members to the pinion members.

Further objects and advantages will be apparent from the following description taken in connection with the accompanying drawing in which:

Fig. 1 is a side elevation partly in section of a starter drive showing one preferred embodiment of the invention;

Fig. 2 is a fragmentary sectional view of a portion of a pinion and counterweight member showing a second embodiment of the invention, the parts being illustrated as formed preparatory to being forced into engagement;

Fig. 2a is a similar view of the parts in assembled position;

Figs. 3, 4, 5, 6, 7, and 8 are views similar to Fig. 2 of optional embodiments of the invention; and Figs. 3a, 4a, 5a, 6a, 7a, and 8a are corresponding views showing the parts in their assembled positions.

Referring first to Fig. 1 of the drawing, there is illustrated a conventional form of starter drive embodying a power shaft 1 which may be the extended armature shaft of a starting motor, not shown, a driving head 2 fixed thereon and a screw shaft 3 freely mounted thereon having a driven head 4 yieldably connected to the driving head 2 by means of a drive spring 5. A pinion member 10 indicated generally by numeral 6 is threaded on the screw shaft 3 for movement into and out of engagement with a member such as the flywheel gear of an engine, not illustrated.

According to the present invention, the pinion member 6 is formed of two parts, namely the pinion body 7 and a counterweight member 8 anchored thereto, and the particular novelty resides in the means for permanently unifying these members. As shown in Fig. 1, the teeth of the pinion body 7 are turned down adjacent the rear end of the pinion to form a notch or rabbet therein defined by a radial shoulder 9, the bottom of the notch being inclined or flared rearwardly as shown at 11. The pinion counterweight 8 is punched out with inwardly extending splines 12 formed to enter the spaces between the teeth 7 of the pinion and fit closely the body of the pinion as best shown in Fig. 7 which is a cross-section of a portion of a pinion and counterweight member interlocked in the manner illustrated in Fig. 1. The counterweight 8 is originally provided with a tapered lateral flange 13 located adjacent the bases of the splines 12, the internal diameter of the flange and the body of the counterweight 8 being a close fit with the external diameter of the reduced portion 11 of the pinion teeth.

The component parts of the pinion member are unified by being forced together longitudinally under heavy pressure, whereby the extending flange 13 of the counterweight is deformed by the teeth of the pinion as illustrated in Fig. 7a, the portions thereof opposite the pinion teeth being forced down into intimate contact with the inclined surfaces 11 as illustrated at 14, and the portions between the pinion teeth extending axially in the tooth spaces to form additional spline surfaces 13'. It will thus be seen that when the parts are assembled, the tops of the splines 12 of the counterweight bear on the bottoms of the tooth spaces of the pinion, the splines 12 being interlocked with the reduced portions of the pinion teeth, and the metal of the counterweight between the splines being forced down onto the inclined surfaces 11 of the pinion teeth so as to effectively prevent withdrawal of the counterweight from the pinion.

In the various embodiments of the invention illustrated in Figs. 2, 3, 4, 5, 6 and 8, in each case the pinion and counterweight are similarly interlocked by a spline engagement between the counterweight and the teeth of the pinion, the tops of the splines in the counterweight being arranged to bottom in the tooth spaces in the pinion, and integral portions of the counterweight adjacent the bottoms of the splines being forced against inclined surfaces on the pinion formed by cutting away the tops of the teeth thereof. Thus in Figs. 2 and 2a there is illustrated an embodiment of the invention in which the teeth of the pinion 17 are turned down adjacent the rear of the pinion to receive the internally splined counterweight 18, and an inclined channel 19 is cut in the pinion teeth leaving a series of projections 21 arranged to penetrate the side of the counterweight 18 and force portions thereof into the inclined channel 19 as illustrated at 22 in Fig. 2a. Relative rotation between the counterweight and pinion is thus prevented by the interengagement of the pinion teeth and counterweight splines, and withdrawal of the counterweight is prevented by the engagement of the projections 22 in the inclined channel 19 of the pinion.

In Figs. 3 and 3a there is illustrated a rather similar arrangement except that the projections 31 of the teeth of the pinion 27 are located inwardly from the tops of the teeth and are sharpened in order to facilitate penetration into the body of the counterweight 28 as illustrated in Fig. 3a.

It is not essential that the pinion or the counterweight be provided with lateral projections, since the ends of the teeth of the pinion may be used to distort the metal adjacent the bottoms of the splines in the counterweight in order to produce the interlocking engagement desired. Thus in Figs. 4 and 4a a simpler construction is illustrated in which the teeth of the pinion 37 are turned down for a portion of their depth, the bottom of the rabbet or recess so formed being inclined as indicated at 41 similarly to the structure illustrated in Fig. 1. The counterweight 38 is here formed as a plain ring with internal splines 42 interfitting with the teeth of the pinion, and when the parts are forced together as illustrated in Fig. 4a, the teeth of the pinion 37 enter the side of the counterweight and force the metal at the bases of the splines thereof down against the inclined surfaces 41 as indicated at 44.

Where it is desired to secure rigid interlocking engagement without the necessity of using as heavy pressure as would be required by the structure illustrated in Figs. 4 and 4a, the counterweight may be provided with an annular recess spaced radially outward from the bottoms of the splines thereof in order to facilitate the flow of metal. Such structure is illustrated in Figs. 5 and 5a in which the pinion 47 is formed similarly to the pinion 37 in Figs. 4 and 4a, but the counterweight 48 is provided with an annular recess 49, the outer wall of which is of substantially the same diameter as the tops of the pinion teeth. When the parts are forced together as illustrated in Fig. 5a, the metal of the counterweight located inwardly of the groove 49 is distorted by the ends of the pinion teeth whereby it is forced down against the inclined surfaces 51 of the pinion teeth as illustrated at 54, the intermediate portions thereof extending between the pinion teeth as illustrated at 55.

In the embodiment of the invention illustrated in Figs. 6 and 6a the ends of the teeth of the pinion 57 are turned down to form a rabbet having inclined surfaces 51 which are tapered in the opposite direction from the structures previously described, leaving shoulders 50 in the form of radially extending lugs adjacent the end of the pinion. The counterweight 58 is formed as a plain ring with internal splines 52 resting on the bottoms of the tooth surfaces of the pinion. In this embodiment of the invention the parts are unified by applying localized pressure to the outer side of the counterweight as by means of a suitably formed punch so as to form recesses 53 therein and force the adjacent metal at the roots of the splines 52 down onto the inclined surfaces 51 of the pinion teeth as illustrated at 54.

In Figs. 8 and 8a there is illustrated an embodiment of the invention in which the counterweight is of smaller diameter and is formed in two parts in order to secure the necessary thickness to possess the mass desired. As here shown, the teeth of the pinion 67 are provided with a peripheral groove 69 spaced from the ends thereof, and a pair of counterweight members 68 in the form of plain internally splined rings are pressed onto the end of the pinion until they are centered over said groove. The counterweights are thereupon locked on the pinion by being punched inwardly in the tooth spaces of the pinion as illustrated in Fig. 8a.

It will be understood that in the various embodiments illustrated, the counterweight may be in the form of a barrel or cylinder with a constricted end to fit the end of the pinion. In any case, the interlocking of the parts is secured by a splined engagement between the pinion and counterweight in which the counterweight is rigidly held in alignment by the bottoming engagement of the counterweight splines and pinion teeth, and the parts are prevented from longitudinal withdrawal by means of a deformation of the metal of the counterweight adjacent the roots of the splines so as to interlock with inclined formations on the reduced portions of the pinion teeth, and these basic features may be embodied in other structures without departing from the spirit of the invention as defined in the claims appended hereto.

What is claimed is:

1. An engine starter driving member including a pinion having peripheral teeth extending throughout its length, said pinion teeth being reduced in diameter adjacent one end so as to form abutment shoulders with inclined portions adjacent thereto, and an annular member mounted on said reduced portion having inwardly directed splines fitting the tooth spaces of the pinion, the metal between the bases of the splines in the annular member being displaced inwardly to closely fit the inclined portions of the pinion teeth.

2. An engine starter driving member including a pinion having peripheral teeth extending throughout its length, said pinion teeth being reduced in diameter adjacent one end so as to form abutment shoulders with inclined portions adjacent thereto, and an annular member having inwardly directed splines adapted to fit the tooth spaces of the pinion and having an annular groove radially spaced from the bases of its splines to facilitate the flow of metal when the parts are forced together so as to securely grip the inclined portions of the pinion teeth.

3. An engine starter driving member including a pinion having peripheral teeth extending throughout its length, said pinion teeth being reduced in diameter adjacent one end so as to form abutment shoulders with inclined portions adjacent thereto, and an annular member having a central opening with inwardly directed splines adapted to fit the tooth spaces of the pinion, the bottoms of the tooth spaces in the annular member being formed to fit on the reduced portions of the pinion teeth, said annular member having means to facilitate the flow of metal around the inclined portions of the pinion teeth when the members are forced together, so as to securely anchor the annular member on the pinion.

4. An engine starter driving member including a pinion having peripheral teeth, the tops of said teeth being recessed to provide inwardly inclined portions, and a member having a central opening with inwardly directed splines occupying the tooth spaces of the pinion, and having projections intermediate said splines displaced inwardly to conform to the inwardly inclined portions of the pinion teeth.

5. An engine starter driving member including a pinion having peripheral teeth extending throughout its length, the tops of said teeth being recessed to provide abutments with inwardly inclined portions adjacent thereto, and a member having a central opening with inwardly directed splines occupying the tooth spaces of the pinion, and having projecting portions intermediate said splines displaced inwardly to engage said abutments and conform to the inwardly inclined portions of the pinion teeth.

6. An engine starter drive member including a pinion having peripheral teeth and a counterweight having a serrated bore adapted to receive the pinion, said pinion having a peripheral shoulder with an inwardly inclined portion, and an axially projecting portion adjacent thereto arranged to penetrate the body of the counterweight when the parts are assembled and force a portion thereof into engagement with the inclined portion of the pinion.

7. An engine starter drive member including a pinion having peripheral teeth and a counterweight having a serrated bore adapted to receive the pinion, said pinion having a peripheral shoulder with an inwardly inclined portion, and said counterweight having a lateral projection adapted to be deformed when the parts are assembled and forced into engagement with the inclined portion of the pinion.

8. An engine starter drive member including a pinion having peripheral teeth and a counterweight having an internally splined bore adapted to receive the pinion, said pinion teeth being peripherally grooved, the metal of said counterweight between the roots of its splines being displaced inwardly into said groove.

YOUSTON SEKELLA.